D. O. REINHOLD.
SELF ADJUSTING SPREADER FOR SAWS.
APPLICATION FILED DEC. 18, 1916.
1,228,047.
Patented May 29, 1917.
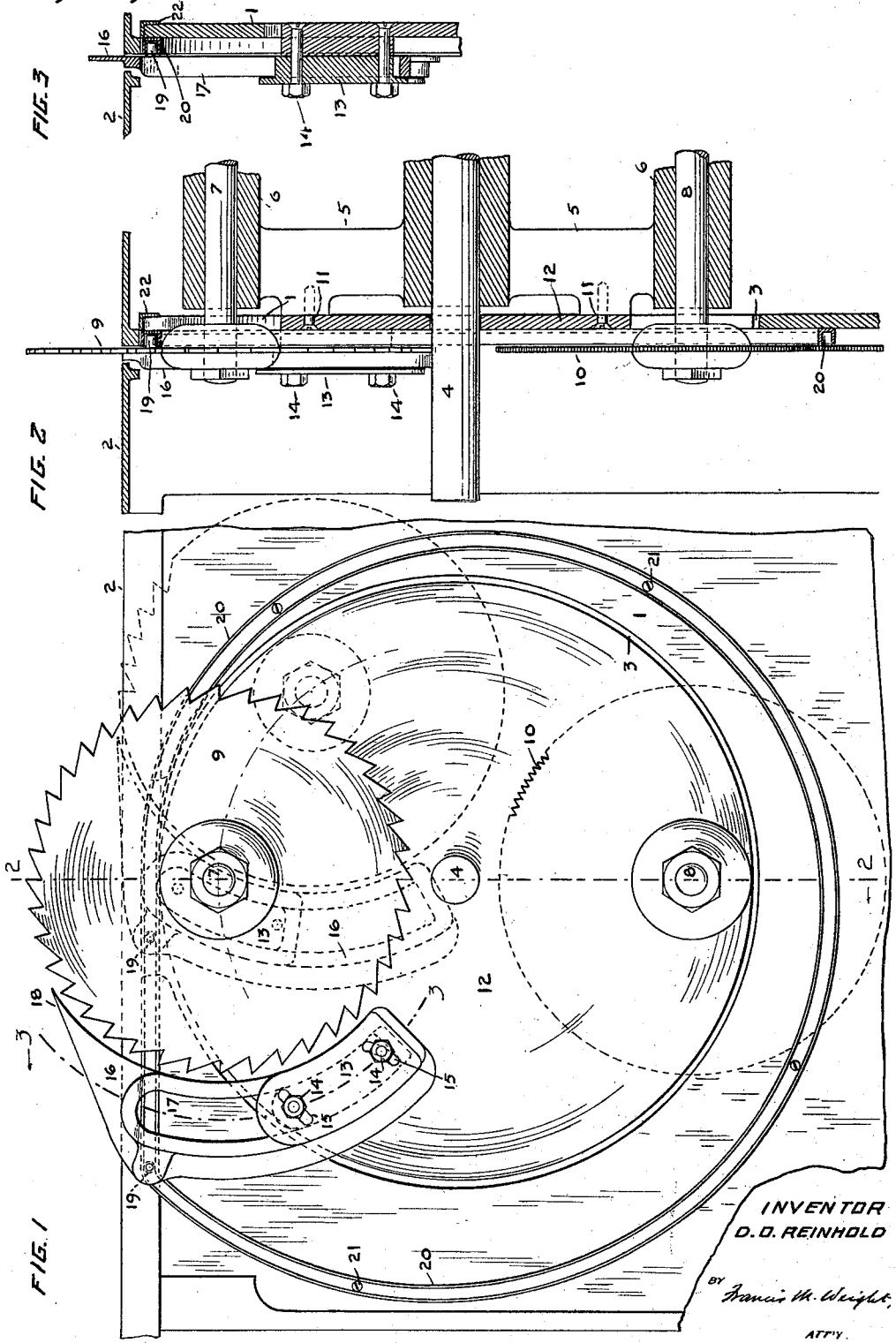
INVENTOR
D. O. REINHOLD

UNITED STATES PATENT OFFICE.

DARWIN O. REINHOLD, OF SAN FRANCISCO, CALIFORNIA.

SELF-ADJUSTING SPREADER FOR SAWS.

1,228,047.  Specification of Letters Patent.  Patented May 29, 1917.

Application filed December 18, 1916. Serial No. 137,549.

*To all whom it may concern:*

Be it known that I, DARWIN O. REINHOLD, a citizen of the United States, residing at San Francisco, in the county of San Francisco and State of California, have invented new and useful Improvements in Self-Adjusting Spreaders for Saws, of which the following is a specification.

The object of the present invention is to provide an attachment for circular saws which will serve both as a rear guard and as a spreader for the sides of the cut made by the saw, and which will automatically adjust itself to the various positions of the saw.

In the accompanying drawing, Figure 1 is a side view of a portion of a Universal saw bench equipped with my improvement, one side thereof being removed; Fig. 2 is a vertical section on the line 2—2 of Fig. 1; Fig. 3 is a section on the curved line 3—3 of Fig. 1.

Referring to the drawing, 1 indicates a vertical member of a Universal double-arbor saw table 2, having a circular hole 3 therein, in the center of which is a shaft 4, which can be rotated by any suitable means, not here shown. Connected to the shaft 4 is a double arm 5, which carries bearings 6 for arbors 7, 8 of saws 9, 10. By turning the shaft 4, either saw can be brought into position at the top of the table, and said uppermost saw can be adjusted as to height above the top of the table, in order to vary the depth of the cut made by the saw.

In said hole 3 and secured by screws 11 to the double arm 5 is a disk 12, which therefore rotates with the shaft 4.

13 indicates a spreader holder secured to the disk 12 by means of bolts 14, and which can be adjusted to fit closely around a saw of any size by means of slots 15 through which said bolts extend. A spreader 16 has a slot 17 curved in an arc of a circle about the center of the saw 9 as center and said spreader holder is similarly curved so as to fit within said slot and to permit the spreader to have a circular sliding motion on said spreader holder. Said spreader has a pointed portion 18 extending behind the saw teeth to hold apart the two portions of the wood on each side of the cut made by the saw.

Said spreader has a pin 19, which is received in a continuous grooved cam 20 secured to the member 1 of the frame by means of screws 21, and reinforced at the top by means of an angle iron 22. Said cam 20 extends in a straight horizontal direction in the upper portion, but from the front end of said straight portion extends in an expanding spiral to the rear end of the straight portion.

When the shaft 4 moves in the forward direction, carrying with it the saws 9, 10, and the disk 12, since the spreader holder is attached to the disk 12, the spreader remains close to the saw 9, but, by reason of the pin 19 traveling in the horizontal portion of the cam groove, the point, or operative portion, of the spreader is lowered or raised as the saw is lowered or raised, and in all cases is lower than the tangent to the saw at its uppermost point. This enables an operator to rabbet out stock, or do other work of various kinds, without removing the spreader, which he would have to do were the spreader not free to move on the holder.

Spreaders can be applied behind both saws simultaneously without interfering with each other, using the same grooved cam.

I claim:—

1. In combination with a circular saw, and means for raising and lowering the same, a spreader for the material cut by said saw, located adjacent to the rear portion of the saw near to, but below, the top of the same, and means for automatically raising or lowering the spreader with the rise or descent of the saw, while maintaining it adjacent thereto.

2. In combination with a circular saw, having a shaft and means for revolving said shaft and saw about an external axis, a rear spreader for said saw, a spreader holder revoluble with said shaft about said axis, said spreader being movable relatively to said spreader holder, and means for guiding said spreader while said holder is so revolving.

3. In combination with a circular saw, having a shaft and means for revolving said shaft and saw about an external axis, a rear spreader for said saw, a spreader holder revoluble with said shaft about said axis, said spreader being movable relatively to said spreader holder, a pin carried by said spreader, and a cam for guiding said pin in the revolution of said holder.

4. In combination with a circular saw, having a shaft and means for revolving said shaft and saw about an external axis, a rear spreader for said saw, a spreader holder revoluble with said shaft about said axis, said spreader being movable relatively to said spreader holder, a pin carried by said spreader, and a cam for guiding said pin in the revolution of said holder, said cam having a straight portion, the two ends of the straight portion being joined by a curved portion extending around said axis.

5. In combination with a circular saw, having a shaft and means for revolving said shaft and saw about an external axis, a rear spreader for said saw, a spreader holder revoluble with said shaft about said axis, and adjustable for saws of different diameters, said spreader being movable relatively to said spreader holder, and means for guiding said spreader while said holder is so revolving.

DARWIN O. REINHOLD.

Copies of this patent may be obtained for five cents each, by addressing the "Commissioner of Patents, Washington, D. C."